April 19, 1966          L. GROSSMANN          3,246,710
DEVICE FOR FACILITATING THE PARKING OF VEHICLES
Filed Feb. 7, 1963                                2 Sheets-Sheet 1
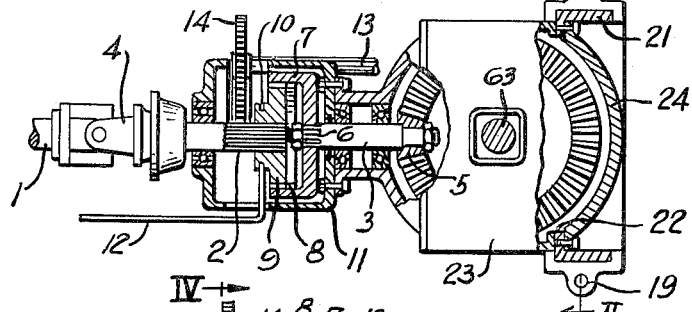
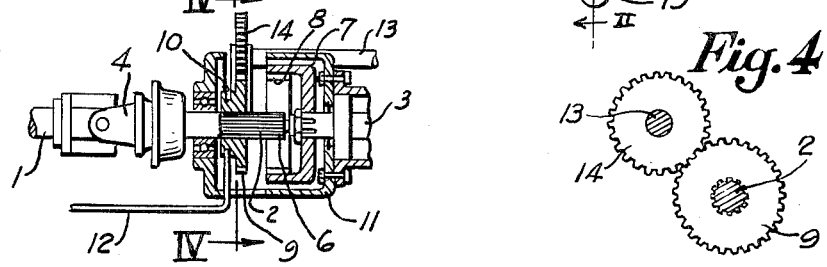
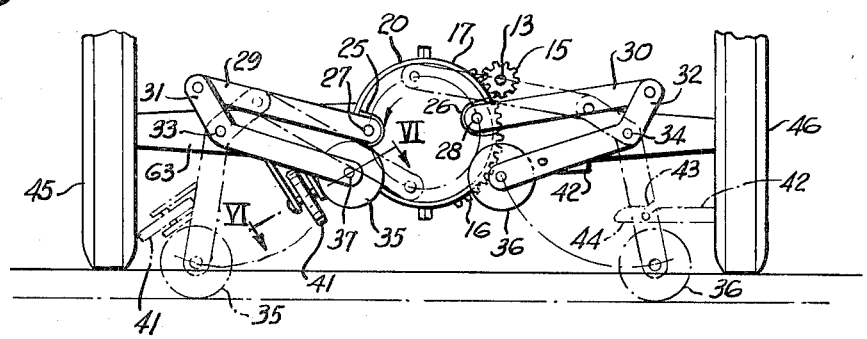
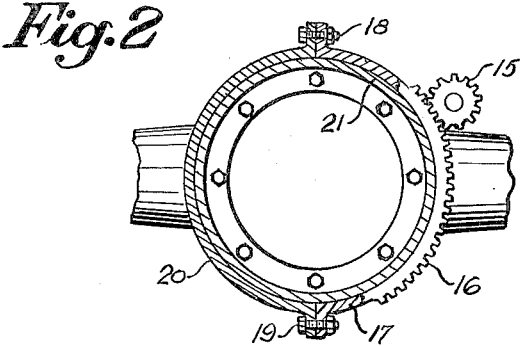
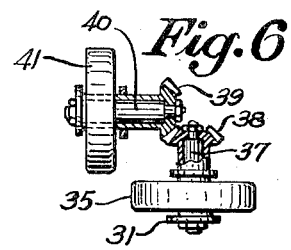
INVENTOR.
L. GROSSMANN
BY Richards & Geier
ATTORNEYS

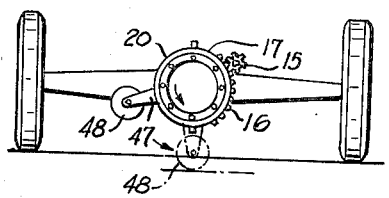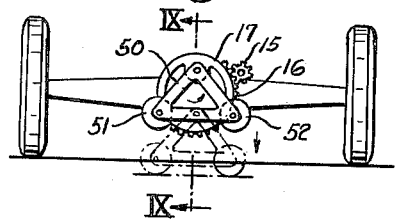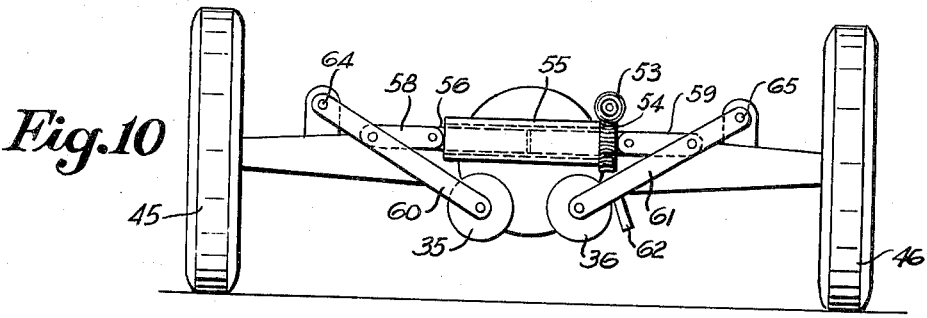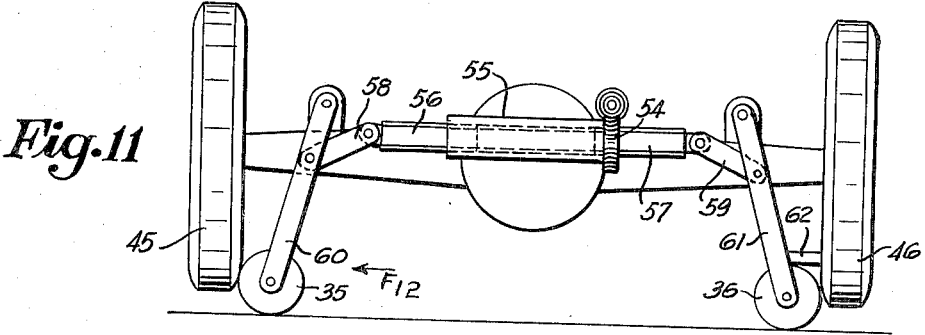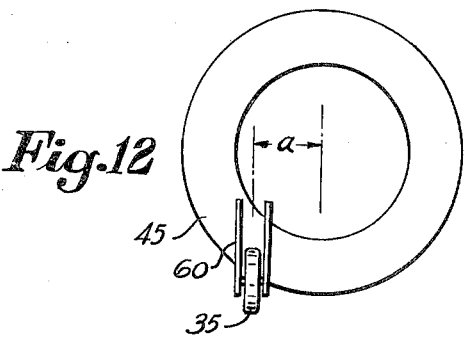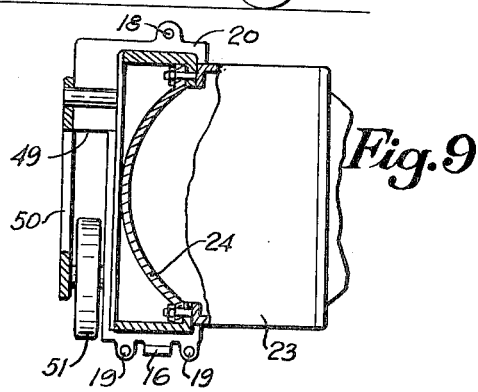

United States Patent Office 3,246,710
Patented Apr. 19, 1966

3,246,710
DEVICE FOR FACILITATING THE PARKING
OF VEHICLES
Ladislau Grossmann, 27 Quinten Matsyslei,
Antwerp, Belgium
Filed Feb. 7, 1963, Ser. No. 256,912
Claims priority, application Belgium, July 13, 1962,
41,826, Patent 620,199
2 Claims. (Cl. 180—1)

The present invention concerns improvements in installations which serve for facilitating the parking of vehicles; the installation of the present invention consists of one or more additional wheels which are mounted under the vehicle and of a mechanism by means of which these wheels can be moved.

The improvements according to the present invention are more especially concerned, on the one hand, with the lifting device, and on the other hand with the means for moving the device and for driving aforesaid wheel or wheels in the desired direction.

These improvements are described in fuller detail below, with reference to the appended drawings in which:

FIGURE 1 is a side view with partial section of the driving mechanism for the lifting device;

FIGURE 2 is a section along the straight line II—II of FIGURE 1;

FIGURE 3 illustrates a second position of the device according to FIGURE 1;

FIGURE 4 is a diagrammatic cross-section along the straight line IV—IV of FIGURE 3;

FIGURE 5 illustrates a lifting device conforming to the present invention;

FIGURE 6 is a cross-section along the straight line VI—VI of FIGURE 5;

FIGURES 7 and 8 illustrate two alternative embodiments of a lifting device;

FIGURE 9 is a cross-section along the straight line IX—IX of FIGURE 8;

FIGURE 10 illustrates, in the position of rest, an alternative embodiment of the lifting device according to FIGURE 5;

FIGURE 11 represents the device according to FIGURE 10, in the operating position;

FIGURE 12 is a view in the direction of arrow F12 of FIGURE 11.

In FIGURES 1 to 3, a device is illustrated by means of which it is possible to use the engine of the vehicle to impart additional movements thereto, whereby this device is mounted at the rear end of the drive shaft which connects the gear box to the rear axle.

In this embodiment the universal joint 4 of the drive shaft 1 is connected with a shaft 2 provided with long grooves. In the extension of aforesaid shaft 2 there is a shaft 3 whose free end carries the drive pinion 5, whilst the shafts 2 and 3 are mutually connected concentrically by means of a trunnion 6 which is provided at the end of shaft 2 and can rotate with sliding friction in a recess provided in the adjacent end of shaft 3, or rotate therein by means of an intermediate needle bearing.

On that extremity of shaft 3 which faces shaft 2, a drum 7 is fastened which carries the hollow toothed ring 8, whereas shaft 2 carries a pinion 9 which can slide freely over the grooves of this shaft and is provided with a peripheral groove 10. Aforementioned shafts and gears are all contained in a housing 11. Aforementioned peripheral groove 10 engages the extremity of a control rod 12 which is connected to a (non represented) control lever located within easy grip of the driver.

Onto aforesaid housing 11 a (non represented) boss is fastened carrying a shaft 13 which is provided with a pinion 14, mounted in such way that it can engage pinion 9, whereby the other end of this shaft 13 carries a pinion 15 of the lifting device. This pinion 15 engages a toothed segment 16 provided on a clevis 17 whose cross-section is U-shaped. This clevis is connected with bolts 18–19 to another clevis 20. Both clevises which are thus connected together encompass with sliding friction a ring 21 which is solidly clamped by means of a flange 22 between the housing 23 and the cover 24 of the rear axle 63.

Onto the clevises 17 and 20, two radial projections 25 and 26 are provided, which carry pivots 27 and 28. Onto these pivots are linked arms 29 and 30 respectively of which the other ends are linked with bell-cranks 31 and 32 respectively. These bell-cranks are connected by pivots 33–34 respectively to corresponding parts of the rear axle 63 and carry on their free ends rollers 35, 36 respectively.

The shaft 37 of roller 35 carries an angle pinion 38 onto which roller 35 is fastened and which engages a second angle pinion 39 carried by a shaft 40, whereby aforesaid conical gear 39 carries in turn a roller 41 whose median plane is normal to that of roller 35.

Lever 32 carries a swivelling finger 42 which is compelled by a spring 43 to take up a position which is normal to the direction of lever 32. The rear end of this finger is provided with a rounded extension 44 which can come into contact with a stay (not shown) of the rear axle.

The operation of this device is as follows: in the position illustrated in FIGURE 1, pinion 9 engages the internal toothed ring 8, whereby the rear axle is driven by the transmission shaft 1. In order to enable the vehicle to move side ways, its rear wheel must be lifted from the ground.

For this purpose, pinion 9 is brought into engagement with pinion 14 (FIGURE 3) by means of rod 12. If now gearbox is shifted into an appropriate ratio, toothed pinion 14 will be driven, as well as toothed pinion 15 and the clevises 17 and 20. This causes a displacement of the scissor device 27–32, through which the rollers 35–36 move downward, come into contact with the ground and cause the rear part of the vehicle to be lifted by reaction, and this until, on the one hand, roller 41 presses against the corresponding tire 45 and on the other hand, finger 42 presses against tire 46. It should be noted in this connection that on account of the slanting position of the levers 31 and 32 which has just been achieved, the result is attained that the weight of the vehicle helps to maintain roller 41 and finger 42 pressed steadily against their respective wheels.

Next, pinion 9 is once more brought into engagement with the internal toothed ring 8, after which, by causing the transmission shaft 1 to rotate in the required direction via the gearbox, a lateral displacement of the vehicle is obtained because wheel 46 is prevented from rotating by the pressure of finger 42, whereas the tire of wheel 45 drives the roller 41 and therefore also roller 35.

It is evident that for moving the vehicle sideways and for lowering it, the gearbox must be shifted in reverse with respect to the former operation.

In FIGURE 7 an embodiment is illustrated in which clevis 20 carries an arm 47 whose free end carries a roller 48 which can be driven by any suitable servo-motor (not shown). The motion of arm 47 can be obtained by means of the mechanism illustrated in FIGURE 1 to 4.

In FIGURE 8 a device is illustrated which can also be controlled by the mechanism represented in FIGURES 1 to 4, whereby in this case, one of the clevises 17 or 20 carries an ear 49 onto which a triangular support 50 can swivel which carries the two rollers 51 and 52, one of which can for instance be driven by any suitable servo-motor (not shown).

Finally, FIGURES 10, 11 and 12 illustrate another alternative of FIGURE 5. In this case, the median plane of roller 35–36 is located at a predetermined distance *a* off the centerline of the rear axle.

Aforesaid shaft 13 is here provided with a worm 53 which engages a worm wheel 54. The latter is fastened to a sleeve 55, one half of whose length is provided with an inner righthand screw thread whereas the other half carries a lefthand screw thread, whereby these screw threads engage corresponding threaded rods 56–57.

The free end of each of these rods is linked with intermediate rods 58–59 respectively, which in turn are hinged to a lever 60–61 respectively one end of which is hinged at 64, 65 to a corresponding part of the rear axle whilst their other end carries the rollers 35–36. Lever 61 is provided with a push finger 62.

The operation is as follows: by an appropriate drive via the mechanism represented in FIGURE 1 sleeve 55 will rotate in the required sense, whereby the threaded rods 56–57 will move outward. Arms 60–61 will therefore move downward until the wheels 35–36 touch the ground and lift the rear part of the vehicle by their reaction on the ground. Roller 35 thus comes directly into contact with tire 45 whereas finger 62 pushes against tire 46.

If now the rear axle is driven in the proper direction, wheel 45 will drive roller 35 whilst finger 62 prevents the rotation of wheel 46.

The parking device according to FIGURES 5, 10 and 11 also makes it possible to put a check to the parking cross-motion by simply applying the normal foot brake, whereby the rotation of wheel 45 as well as of roller 41 and/or 35 is being restrained.

The device according to the present invention is designed in such way that the lifting device can not move downward during normal driving of the vehicle. Gear 9 can indeed only engage either gear 14 or toothed ring 8, but never both together, so that in normal driving, gear 14 is absolutely free and can not possibly actuate the lifting device.

The present invention is in no way limited to the illustrated embodiments, but can be constructed in many different ways and dimensions without departing from the scope of the invention.

What I claim is:

1. In combination with a vehicle having a main shaft, a rear axle, two rear wheels fixed upon said rear axle, means constituting a differential connected with said rear axle, means constituting a gear drive connected with said main shaft, and a slidable gear connected with the second-mentioned means and movable manually into two different positions, said slidable gear engaging the first-mentioned means in one of said positions; a device for imparting raising and transverse movements to said rear wheels for parking purposes, said device comprising two levers, a separate roller rotatably mounted upon one end of each of said levers, and means connected with said levers and engaged by said slidable gear in its other position for lowering said rollers partly below said rear wheels while moving one of said rollers in engagement with one of said rear wheels, wherein the last-mentioned means comprise another gear engaged by said slidable gear in its other position, a shaft firmly connected with said other gear, a worm firmly connected with the last-mentioned shaft, a worm wheel meshing with said worm, a hollow member firmly connected with said worm wheel and having left hand screw threads and right hand screw threads upon the inner surface thereof, and separate threaded rods meshing with the left hand and right hand screw threads, each of said rods being connected to a separate one of said two levers.

2. In combination with a vehicle having a main shaft, a rear axle, two rear wheels fixed upon said rear axle, means constituting a differential connected with said rear axle, means constituting a gear drive connected with said main shaft, and a slidable gear connected with the second-mentioned means and movable manually into two different positions, said slidable gear engaging the first-mentioned means in one of said positions; a device for imparting raising and transverse movements to said rear wheels for parking purposes, said device comprising two levers, a separate roller rotatably mounted upon one end of each of said levers, and means connected with said levers and engaged by said slidable gear in its other position for lowering said rollers partly below said rear wheels while moving one of said rollers in engagement with one of said rear wheels, wherein the last-mentioned means comprise another gear engaged by said slidable gear in its other position, a shift firmly connected with said other gear, a worm firmly connected with the last-mentioned shaft, a worm wheel meshing with said worm, a hollow member firmly connected with said worm wheel and having left hand screw threads and right hand screw threads upon the inner surface thereof, separate threaded rods meshing with the left hand and right hand screw threads, intermediate links having ends pivotally connected with said rods, the other end of each of said links being pivotally connected to a separate one of said two levers intermediate the ends thereof, said two levers having ends pivotally connected to said rear axle.

References Cited by the Examiner

UNITED STATES PATENTS

| | | | |
|---|---|---|---|
| 1,513,282 | 10/1924 | Sheets | 180—1 |
| 1,591,680 | 7/1926 | Pengilly | 180—1 |
| 1,761,554 | 6/1930 | Woolley | 180—1 |
| 1,764,486 | 6/1930 | Woolley | 180—1 |
| 2,685,934 | 8/1954 | Coloma | 180—1 |
| 2,708,002 | 5/1955 | Carpenter | 180—1 |

A. HARRY LEVY, *Primary Examiner.*